F. Leadbeater,
Bed Bottom,
№ 70,583. Patented Nov. 5, 1867.
Fig. 1
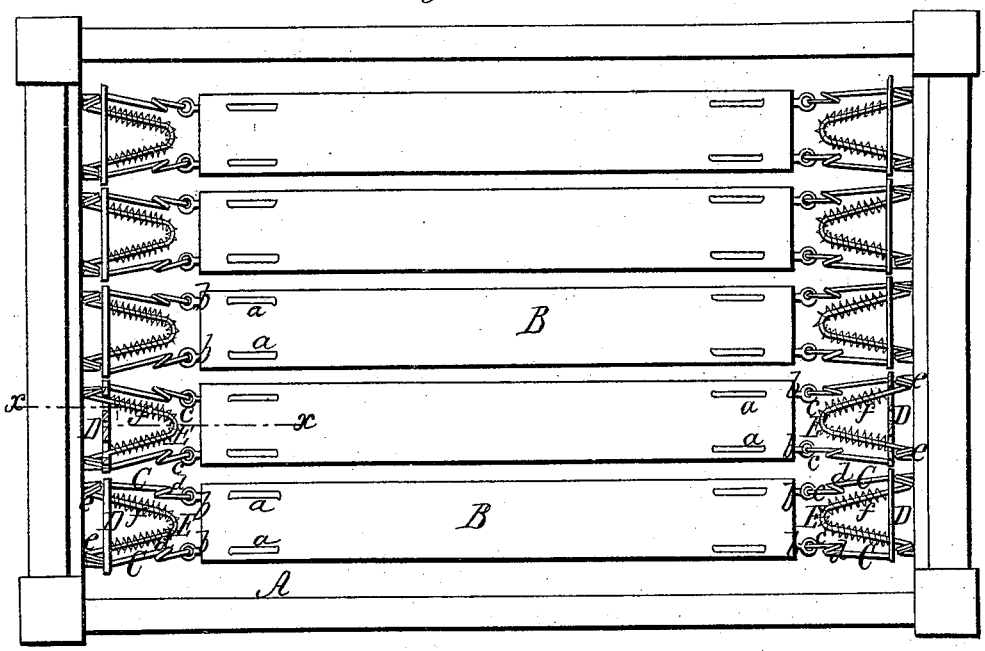
Fig. 2
Fig. 3
Witnesses; 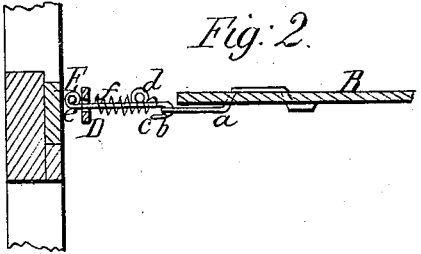
Inventor; 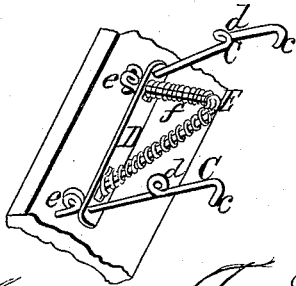
F. Leadbeater
Per ——— Attorneys

United States Patent Office.

FREDERICK LEADBETTER, OF PLYMOUTH, MICHIGAN.

Letters Patent No. 70,583, dated November 5, 1867.

---

IMPROVED BED-BOTTOM.

---

The Schedule referred to in these Letters Patent and making part of the same.

---

TO ALL WHOM IT MAY CONCERN:

Be it known that I, FREDERICK LEADBETTER, of Plymouth, in the county of Wayne, and State of Michigan, have invented a new and improved Spring-Bed Bottom; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved mode of attaching wooden slats to the end pieces of bedsteads, whereby a very durable and elastic bed-bottom is obtained, and one which may be constructed at a comparatively moderate cost. In the accompanying sheet of drawings—

Figure 1 is a plan or top view of my invention.

Figure 2, a section of a portion of the same, taken in the line $x\ x$, fig. 1.

Figure 3, a detached perspective view of the spring connection pertaining to the same.

Similar letters of reference indicate like parts.

A represents a bedstead, which may be constructed in any of the known forms, and B represents a series of slats, which are of wood, of suitable dimensions, and each having two rods or wires $a\ a$ fitted in it at each end, said rods passing through holes upward from the under sides of the slats, and then extending downward through holes from the upper sides of the same, as shown clearly in fig. 2. Each rod or wire $a$ has an eye, $b$, at its outer end to receive hooks $c$ at the ends of wires C, which may be bent so as to have one or more convolutions each, as shown at $d$. These wires C are connected at their outer ends to bars D, the wires at each end of each slat being connected to one bar, as shown in fig. 1; and each bar D is fitted loosely upon a V-shaped wire, E, the latter being driven into the ends of the bedstead, and having one or more convolutions $e$ at each end, and a spiral spring, $f$, upon them, against which the bars D bear.

It will be seen, from the above description, that not only the springs $f$, but also the wires E and C, contribute, in a measure, to the elasticity of the whole connection, and the slats are rendered very elastic and yielding; and, at the same time, a very strong and durable connection of the slats to the bedstead is obtained, and one which may be applied or constructed at a very moderate cost.

Having thus described my invention, I claim as new, and desire to secure by Letters Patent—

Connecting the slats B to the ends of the bedstead by means of the wires C, connected to the ends of the slats, as shown, and attached at their outer ends to bars D, which are fitted loosely on V-shaped wires E, driven in the ends of the bedstead, and having spiral springs $f$ upon them, as herein set forth.

FREDERICK LEADBETTER.

Witnesses:
    THOS. H. JOHNSON,
    JOHN STEWART.